(12) United States Patent
Huang et al.

(10) Patent No.: US 9,784,455 B2
(45) Date of Patent: Oct. 10, 2017

(54) SWITCHING ASSEMBLY OF GAS STOVE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 562 days.

(21) Appl. No.: 14/512,742

(22) Filed: Oct. 13, 2014

(65) Prior Publication Data

US 2016/0102867 A1  Apr. 14, 2016

(51) Int. Cl.
| | |
|---|---|
| *F24C 3/12* | (2006.01) |
| *F16K 3/316* | (2006.01) |
| *F16K 31/50* | (2006.01) |
| *F23K 5/00* | (2006.01) |
| *F23N 1/00* | (2006.01) |

(52) U.S. Cl.
CPC ............. *F24C 3/126* (2013.01); *F16K 3/316* (2013.01); *F16K 31/50* (2013.01); *F23K 5/007* (2013.01); *F23N 1/007* (2013.01); *F23K 2900/05002* (2013.01); *F23N 2035/24* (2013.01)

(58) Field of Classification Search
CPC .......... F24C 3/126; F16K 3/316; F16K 31/50; F23N 1/007; F23N 2035/24; F23K 5/007; F23K 2900/05002
See application file for complete search history.

(56) References Cited

FOREIGN PATENT DOCUMENTS

RU  1774112  * 11/1992

* cited by examiner

*Primary Examiner* — Alfred Basichas
(74) *Attorney, Agent, or Firm* — Tracy M. Heims; Apex Juris, pllc.

(57) ABSTRACT

A switching assembly of a gas stove includes a regulating valve, a knob, a stop board, and a restricting device. The regulating valve has a valve member and a regulating member, which is rotatable to regulate a gas flow through the valve member. The knob is connected to an end of a shaft which is connected to the regulating member with an opposite end thereof, and therefore the regulating member can be rotated by turning the knob. The stop board is located between the valve member and the knob, wherein the stop board has a curved slot, which has a first stop portion and a second stop portion. The restricting member is movable in the curved slot and is restricted by the first or the second stop portions. When the restricting member touches the first stop portion, the switching assembly allows larger gas flow to flow through.

9 Claims, 10 Drawing Sheets

SWITCHING ASSEMBLY OF GAS STOVE

BACKGROUND OF THE INVENTION

1. Technical Field

The present invention relates generally to a gas stove, and more particularly to a switching assembly of a gas stove.

2. Description of Related Art

Typically, conventional gas stoves are classified into natural gas type and gas cylinder type. The main difference between these types is the size of the gas passageway of the gas switch. The gas passageway of the natural gas type usually is larger than that of the liquid gas cylinder type. If a gas switch for natural gas type is mounted in a gas cylinder type gas stove, it will cause incomplete combustion because of the high gas supply. On the contrary, when a gas switch for gas cylinder type is mounted in a natural gas type gas stove, the stove only provides small flames because of the low gas supply. As a result, the manufacturers have to prepare both types of the gas switches for different gas stoves. It makes the cost higher. It will be good for the manufacturers of gas stove if there is a gas switch available for both types of the gas stoves.

BRIEF SUMMARY OF THE INVENTION

In view of the above, the primary objective of the present invention is to provide a switch assembly of a gas stove, which is available for both types of the gas stoves.

The present invention provides a switching assembly of a gas stove, which includes a regulating valve, a shaft, a knob, a stop board, and a restricting device. The regulating valve has a valve member and a regulating member, wherein the regulating member is received in the valve member, and rotatable to regulate a gas flow through the valve member. The shaft has an end connected to the regulating member. The knob is connected to an opposite end of the shaft to be turned to rotate the regulating member. The stop board is located between the valve member of the regulating valve and the knob, wherein the stop has a curved slot, which has a first stop portion, a second stop portion, and a third stop portion. The restricting device is connected to the knob and engaged in the curved slot of the stop board, wherein the restricting device is movable in the curved slot either between the second stop portion and the third stop portion, or between the first stop portion and the third stop portion. The knob is turnable within a first internal if the restricting device is movable between the second stop portion and the third stop portion, and is turnable within a second internal if the restricting device is movable between the first stop portion and the third stop portion, wherein when the knob is turnable within the second interval, a maximum gas flow which the regulating valve is able to supply is larger than that when the knob is turnable within the first interval.

With the design of above, the open area of the exit of the switching assembly is changeable, and therefore the open area of the switching assembly is both suitable for the gas stove of liquid gas cylinder or natural gas.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
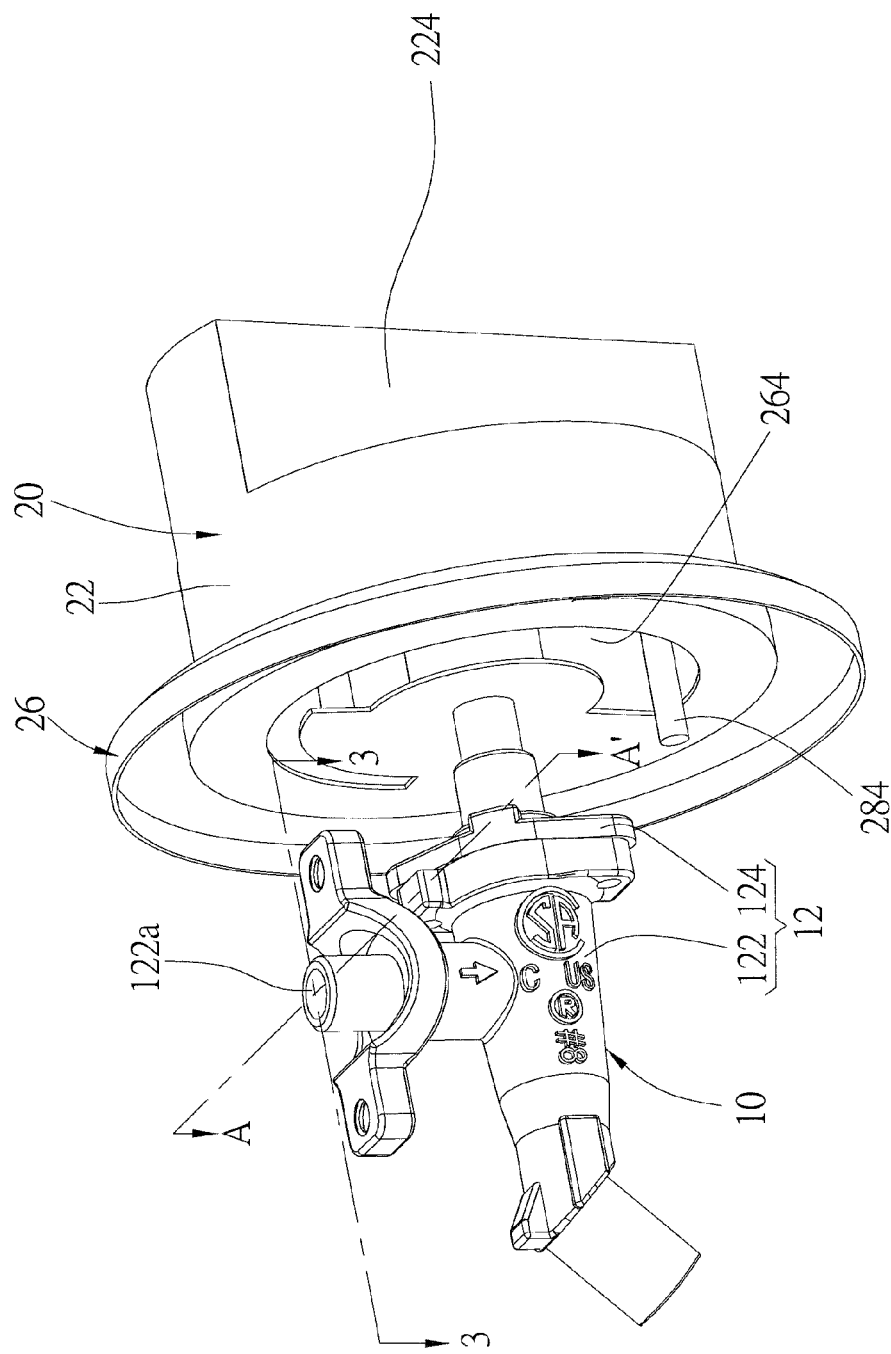
FIG. 1 is a perspective view of a preferred embodiment of the present invention.
Figure 2:
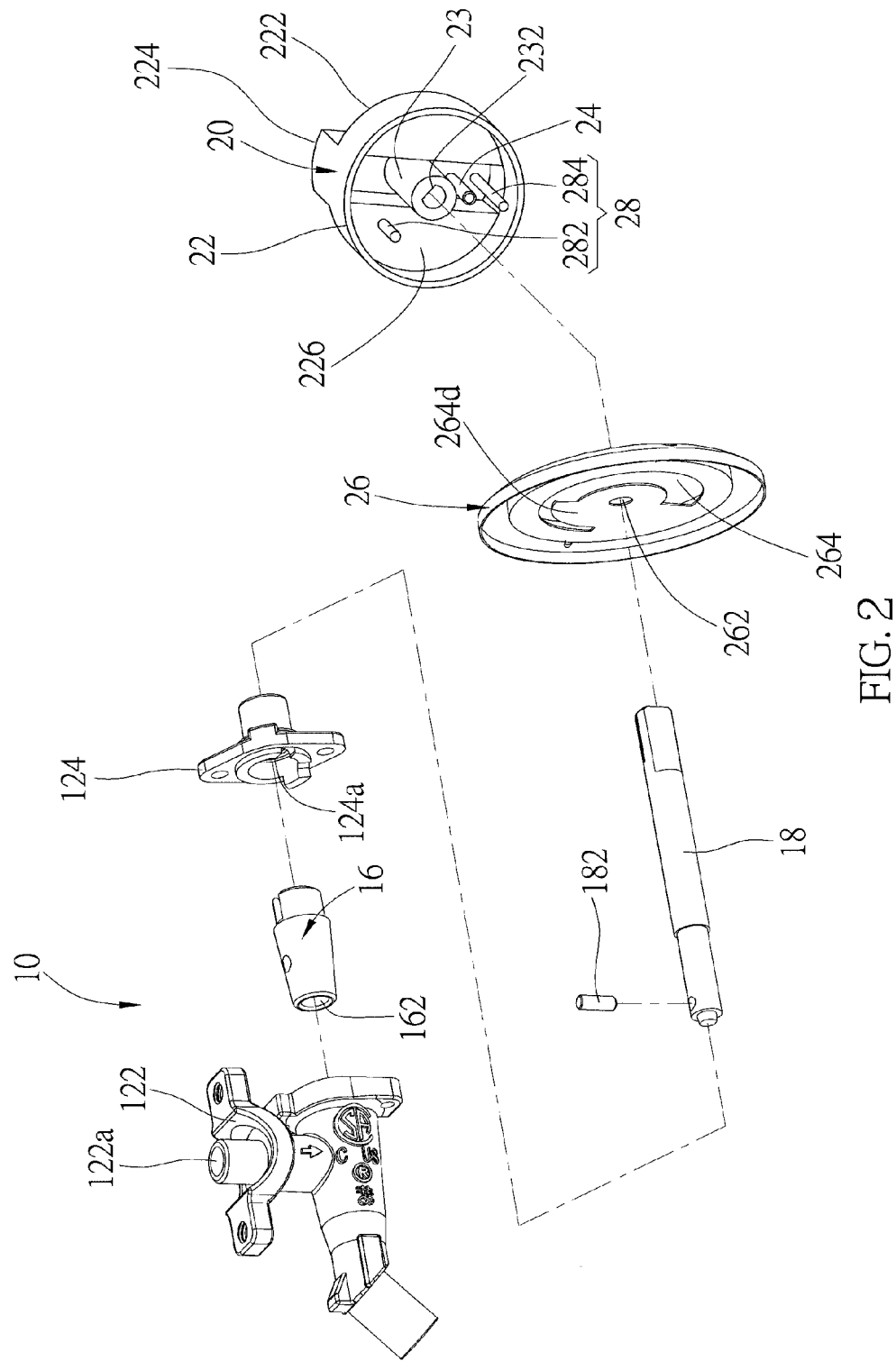
FIG. 2 is an exploded view of the first preferred embodiment of the present invention.
Figure 3:
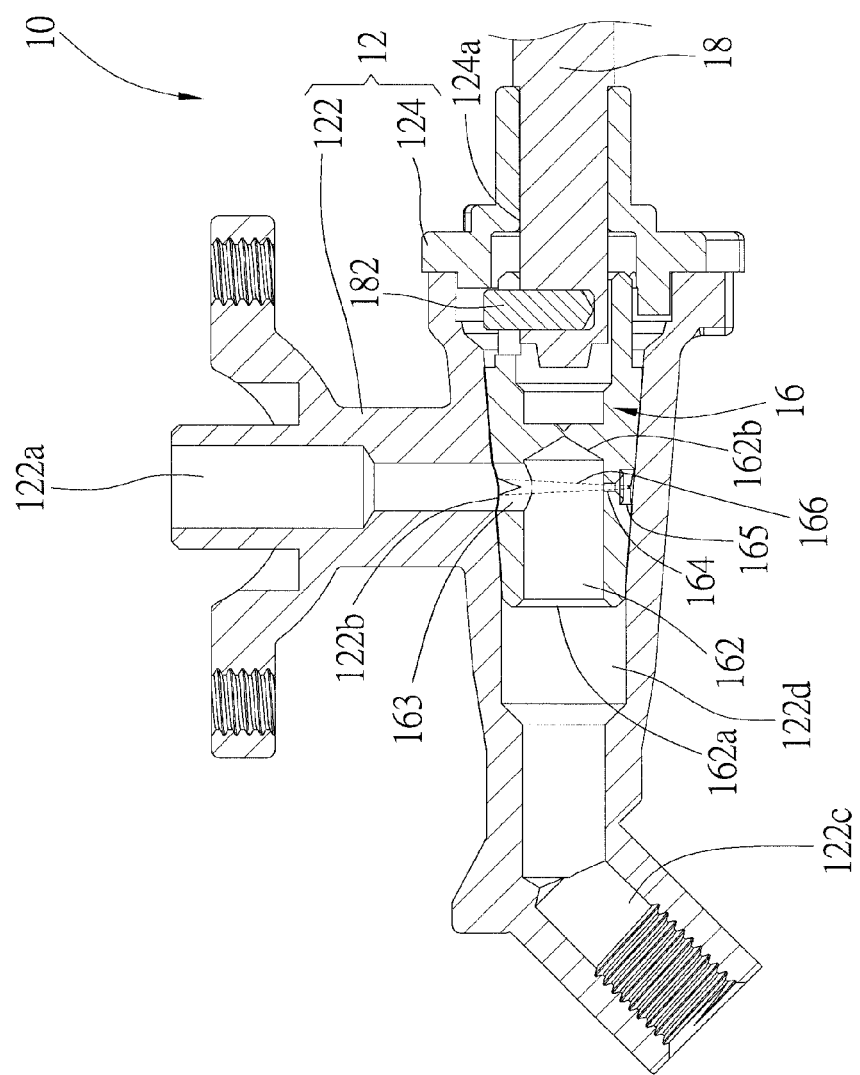
FIG. 3 is a sectional view of the 3-3 line in FIG. 1.
Figure 4:
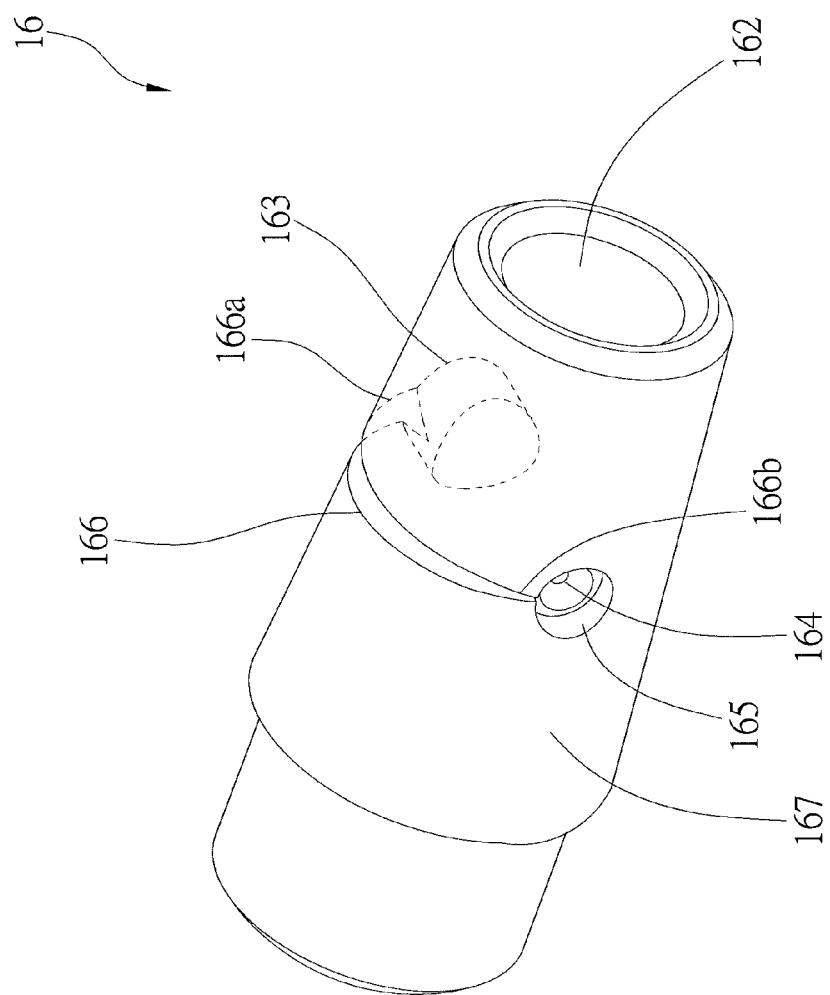
FIG. 4 is a perspective view of the regulating member of the first preferred embodiment of the present invention.

As shown in FIGS. from FIG. 1 to FIG. 3, a switching assembly of a gas stove of the first preferred embodiment of the present invention includes a regulating valve 10, a knob 20, a stop board 26, and a restricting device 28.

The regulating valve 10 includes a valve member 12, a regulating member 16, and a shaft 18. The valve member 12 has a base 122 and a rear lid 124. The base 122 has an input passageway 122a, an output passageway 122c, and a chamber 122d. Gas enters the base 122 via the input passageway 122a, and then flow to the chamber 122d and the output passageway 122c in sequence to leave the base 122 via the output passageway 122c. An exit 122b is formed in the base 122 between the input passageway 122a and the chamber 122c. The rear lid 124 is connected to a back side of the base 122.

The regulating member 16 is received in the chamber 122d of the base 122 for rotation. As shown in FIG. 3, the regulating member 16 has an axial hole 162 along an axis of rotation, a first bore 163 and a second bore 164 respectively extending to the axial hole 162 in a direction perpendicular to the axis of rotation, and a guiding slot 166 on a surface 167 of the regulating member 16. The axial hole 162 has an open end 162a and a closed end 162b, and the open end 162a of the axial hole 162 is communicated with the output passageway 122c of the base 122. The first bore 163 is larger than the second bore 164. The second bore 164 extends to a bottom of a round slot 165 on the surface 167 of the regulating member 16. The guiding slot 166 has a first end 166a and a second end 166b at opposite ends, wherein the first end 166a extends to the first bore 163, and the second end 166b extends to the slot 165. A width of the guiding slot 166 gradually narrows from to first end 166a to the second end 166b. The first bore 163, the second bore 164, and the guiding slot 166 are aligned with the exit 122b of the input passageway 122a respectively when the regulating member 16 is being turned. With a change of the width of the guiding slot 166 when the he regulating member 16 is being turned, a gas flow through the regulating valve 10 is regulated.

The shaft 18 has an end inserted into a bore 124a on the rear lid 124 and is secured to the regulating member 16 by a pin 182. The shaft 18 is turned to rotate the regulating member 16. The knob 20 has a disk-like main member 22, and the main member 22 has an outer side 222 and an inner side 226. The main member 22 has a protrusion 224 on the outer side 222 to be held by user, and a post 23 and a tube 24 on the inner side 226. The post 23 is provided with a bore 232 to engage the other end of the shaft 18.

The stop board 26 is between the knob 20 and the valve member 12, and has a through hole 262 and a hollow portion. In the present invention, the hollow portion is a curved slot 264 having a first stop portion 264a, a second stop portion 264b, and a third stop portion 264c, wherein the first and the third stop portions 264a, 264c are at opposite ends of the curved slot 264, and the second stop portion 264b is between the first and the third stop portions 264a, 264c. A width of the curved slot 264 between the third and the second stop portions 264c, 264b is wider than that between the second and the first stop portions 264b, 264a. In other words, the stop board 26 has a protrusion 264d between the second and the first stop portions 264b, 264a, and the second stop portion 264b is formed on an end of the stop flange 264d. The shaft 18 passes through the through hole 262.

The restricting device 28 includes a first post 282 and a second post 284 on the inner side 226 of the main member 22 of the knob 20. The second post 284 is beside the tube 24, and is inserted into the curved slot 264. In a particular circumference the first post 282 is taken off from the main member 22 and inserted into the tube 24 to be received in the curved slot 264 between the third and the second stop portions 264c, 264b.

Figure 5:
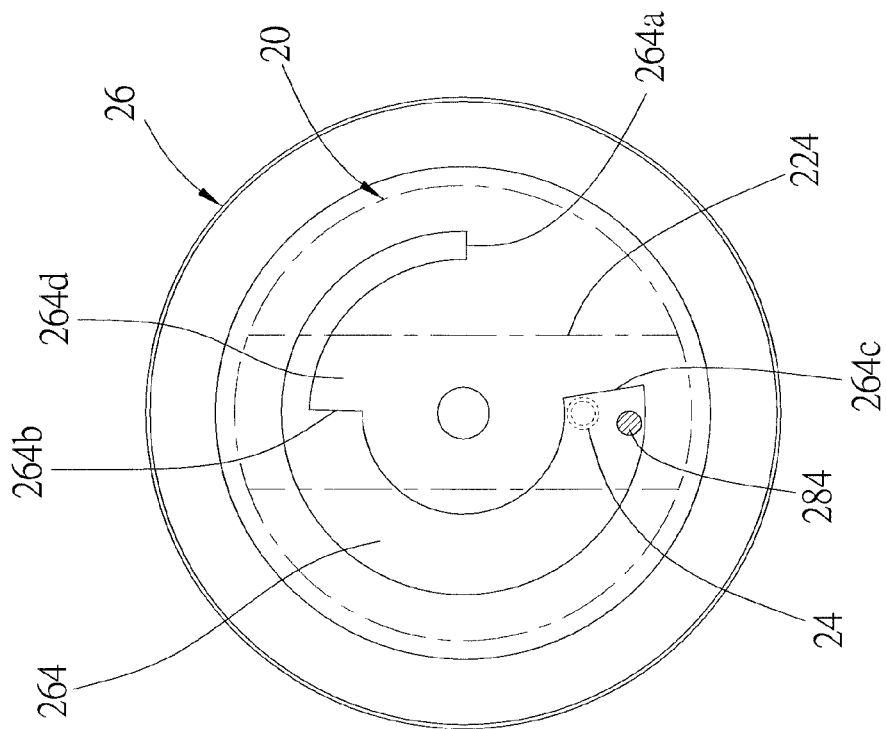
FIG. 5 is a front view of the stop board of the first preferred embodiment of the present invention, showing the second post at the third stop portion.
Figure 6:
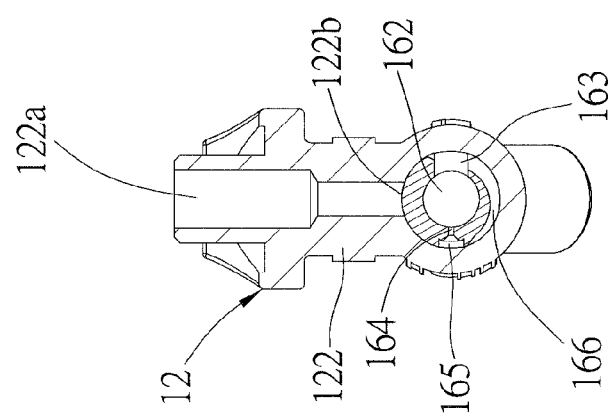
FIG. 6 is a sectional view along the A-A line in FIG. 1, showing the position of the regulating member when the knob is turned to the position of FIG. 5.
Figure 7:
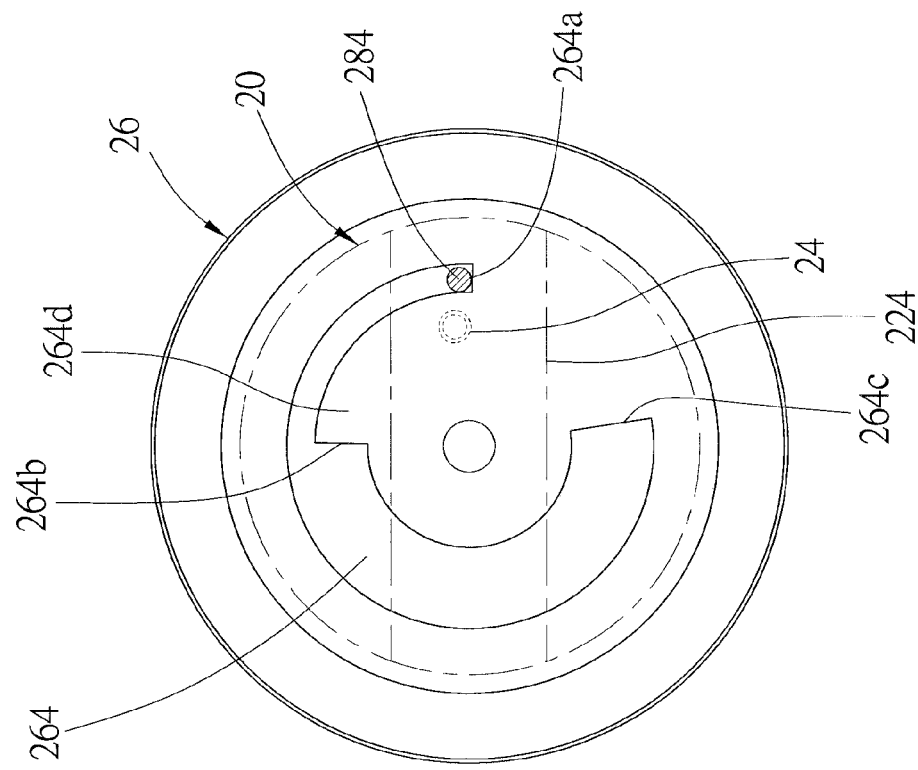
FIG. 7 is a front view of the stop board of the first preferred embodiment of the present invention, showing the second post at the first stop portion.
Figure 8:
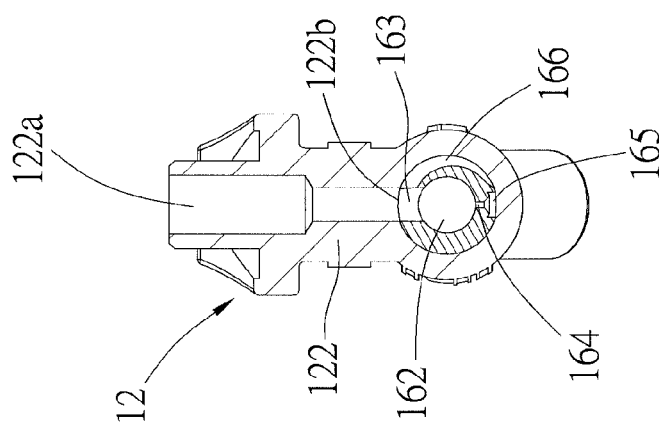
FIG. 8 is a sectional view along the A-A line in FIG. 1, showing the position of the regulating member when the knob is turned to the position of FIG. 7.

As shown in FIGS. form FIG. 5 to FIG. 8, in a circumstance of the first post 282 not in the tube 24, the knob 20 is able to rotate about 270 degrees while the second post 284 moves between the first and the third stop portions 264a, 264c (FIG. 5 and FIG. 7). When the second post 284 touches the third stop portion 264c (FIG. 5), none of the guiding slot 166, the first bore 163 and the second bore 164 is communicated with the input passageway 122a (FIG. 6), so that no gas flows through the regulating valve 10. In other words, the regulating valve 10 is turned off. It defines that a third open area is formed when the second post 284 touches the first stop portion 264a. In the present embodiment, the third open area is zero. In another embodiment, the third open area is greater than zero by changing the locations of the third stop portion 264c.

Figure 9:
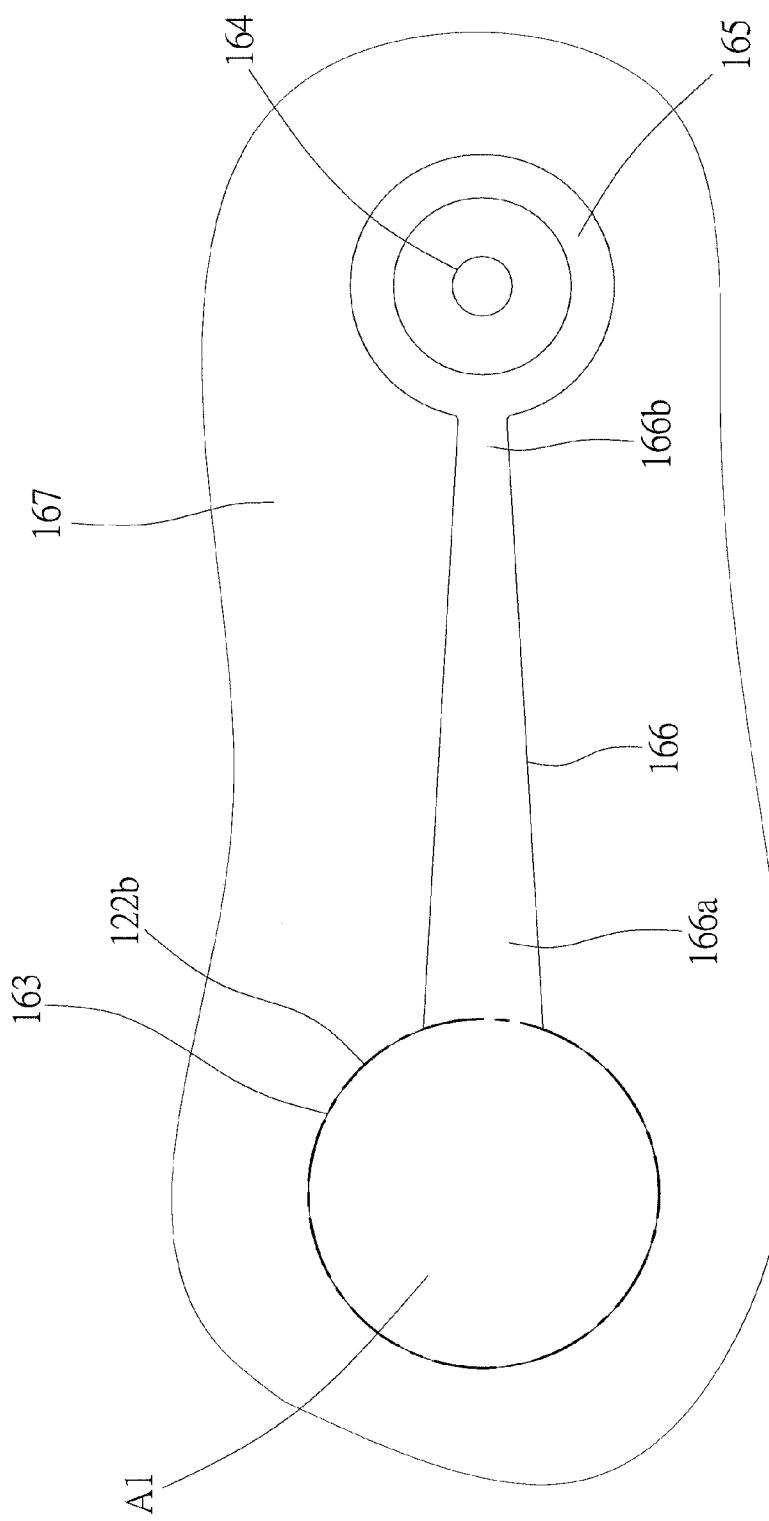
FIG. 9 is a sketch diagram of the surface of the regulating when the knob is turned to the position of FIG. 7.

When the knob 20 is turned clockwise, the second post 284 moves from the third stop portion 264c toward the first stop portion 264a, the guiding slot 166 is moved to a position under the input passageway 122a, and the regulating valve 10 starts to supply a gas flow. The gas flow increases as the knob 20 is being turned, and when the second post 284 arrives at the first stop portion 264a (FIG. 7), the first bore 163 is aligned with the input passageway 122a, and the regulating valve 10 supplies a maximum gas flow. It defines that a first open area A1 is formed when the second post 284 touches the first stop portion 264a (FIG. 9).

Figure 10:
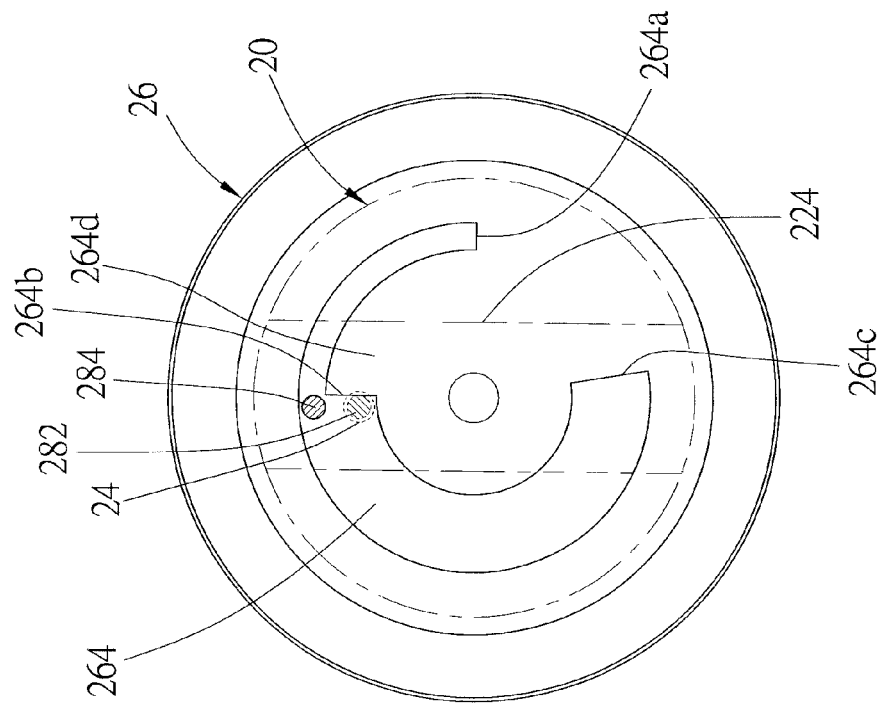
FIG. 10 is a front view of the stop board of the first preferred embodiment of the present invention, showing the second post at the first stop portion.
Figure 11:
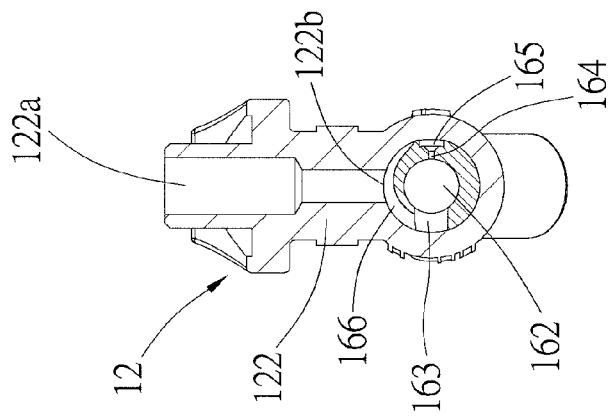
FIG. 11 is a sectional view along the A-A line in FIG. 1, showing the position of the regulating member when the knob is turned to the position of FIG. 10.
Figure 12:
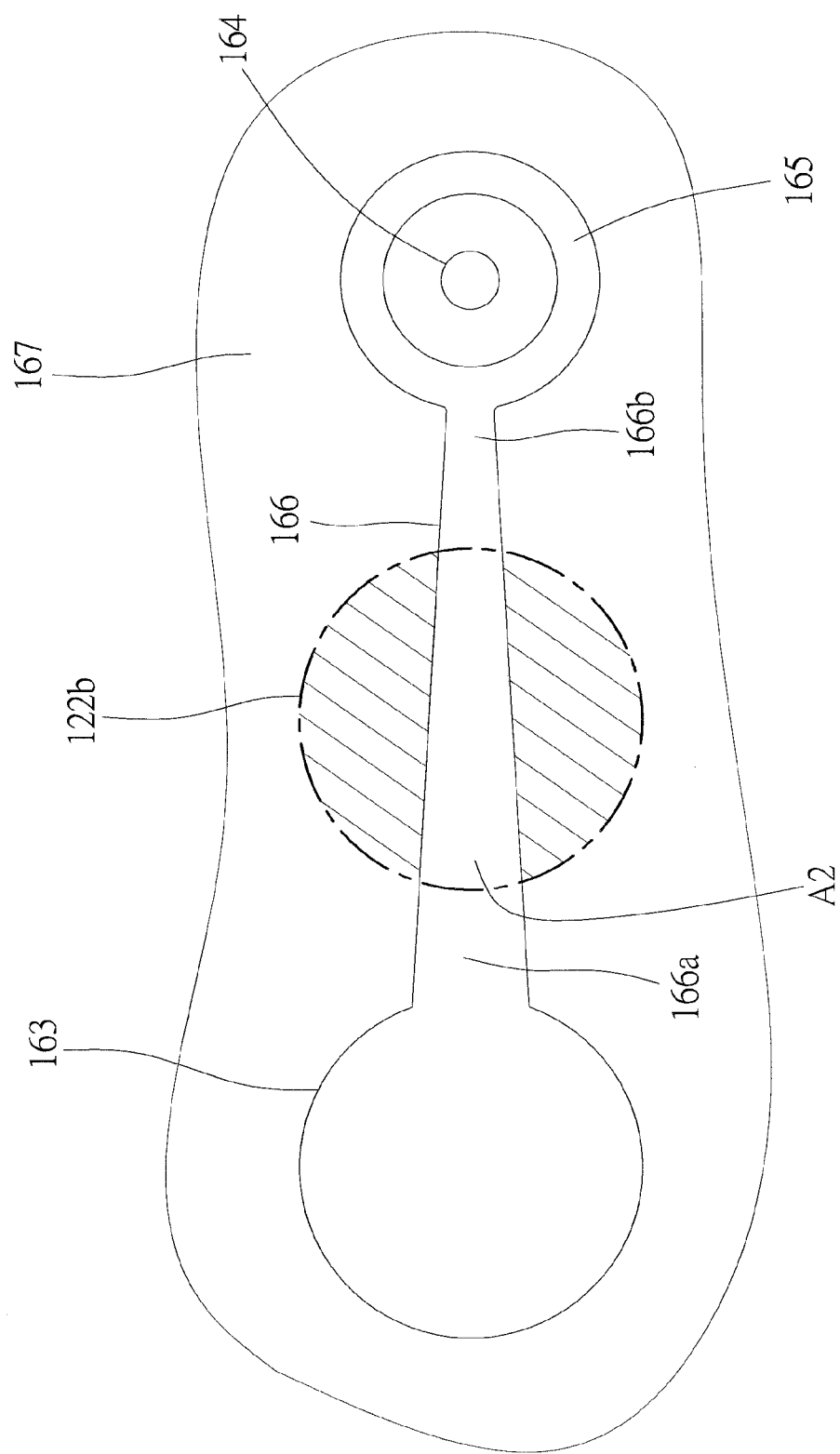
FIG. 12 is a sketch diagram of the surface of the regulating when the knob is turned to the position of FIG. 10.

As shown in FIG. 10, when the first post 282 is inserted into the tube 24, the knob 20 is only able to rotate about 90 degrees while the first post 282 moves between the third and the second stop portions 264c, 264b. When the second post 284 arrives at the second stop portion 264b, a portion of the guiding slot 166 is aligned with the input passageway 122a (FIG. 11 and FIG. 12). It defines that a second open area A2 is formed when the second post 284 touches the first stop portion 264a (FIG. 9), and the first open area A1 is greater than the second open area A2.

In conclusion, the knob 20 is turnable either within a first interval (the first post 282 moves between the third and the second stop portions 264c, 264b) or within a second interval (the second post 284 moves between the third and the first stop portions 264c, 264a), wherein the first interval and the second interval can be decided by whether the first post 282 is inserted into the tube 24 or not. In more details, when the first post 282 is inserted into the tube 24, the knob 20 is turnable within the first interval to supply a small gas supply, which is suitable for the gas stove of liquid gas cylinder. On the contrary, when the knob 20 is turnable within the second interval, the regulating valve 10 supplies a large gas supply, which is suitable for the gas stove of natural gas. In the first interval, the first post 282 moves in a first path between the third and the second stop portions 264c, 264b, and in the second interval, the second post 284 moves in a second path between the third and the first stop portions 264c, 264a. Both the first and the second paths are in the curved slot 264. The first path is parallel to the second path, and shorter than the second path.

Figure 13:
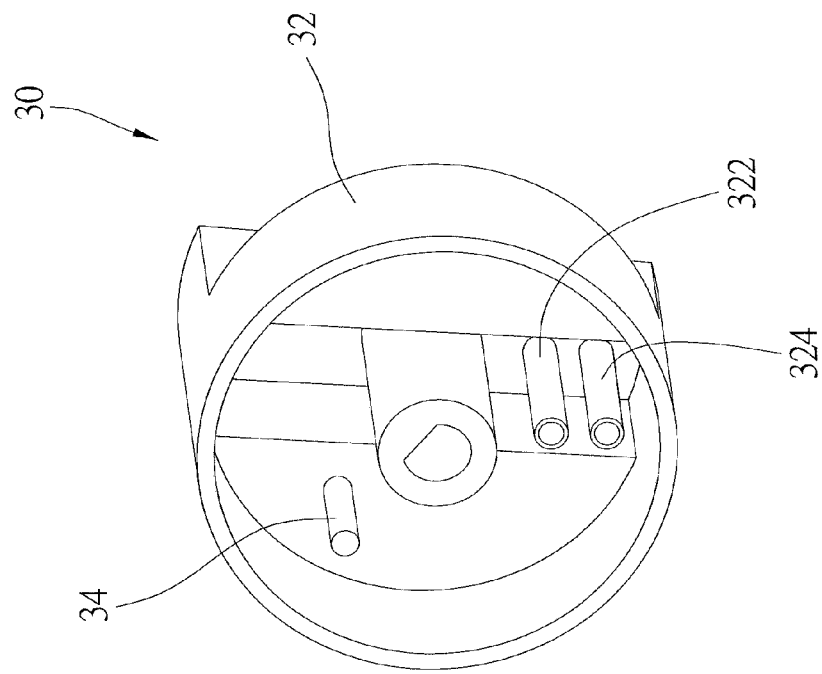
FIG. 13 is a perspective view of the knob of a second preferred embodiment of the present invention.

FIG. 13 shows a knob 30 of the second preferred embodiment, which has a main member 32, a first tube 322, a second tube 324, and a post 34. The post 324 is inherently connected to the main member 32 when the main member 32 was made, and is taken off from the main member 32 to be inserted into the first tube 322 or into the second tube 324. The same as above, the knob 30 is turnable either within a first interval or a second interval, which is decided by whether the post 34 is inserted into the first tube 322 or the second tube 324. In the first interval, the post 34 is in the first tube 322, and moves between the second and the third stop portions 362b, 362c for the gas stove of liquid gas cylinder. When the post 34 is inserted into the second tube 324, the knob 30 is turnable within the second interval, and the post 34 moves between the first and the third stop portions 362a, 362c for the gas stove of natural gas.

Figure 14:
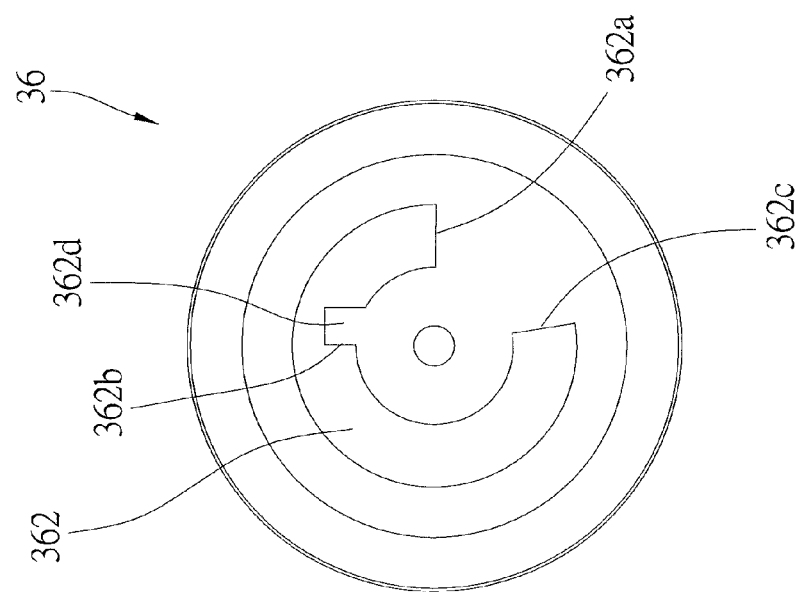
FIG. 14 is a front view of the stop board of a third preferred embodiment of the present invention.

FIG. 14 shows a stop board 36 of the third preferred embodiment, which has a first top portion 362a and a third stop portion 362c at opposite ends. A protrusion 362d is projected from a sidewall of the curved slot 362 to form a second stop portion 362b. In an embodiment, the stop board 36 is a part of a case of the gas stove. In other word, the curved slot 362 is directly provided on the case of the gas stove, and it achieves the same function.

It must be pointed out that the embodiments described above are only some preferred embodiments of the present invention. All equivalent structures which employ the concepts disclosed in this specification and the appended claims should fall within the scope of the present invention.

What is claimed is:
1. A switching assembly of a gas stove, comprising:
   a regulating valve having a valve member and a regulating member, wherein the regulating member is received in the valve member, and rotatable to regulate a gas flow through the valve member;
   a shaft having an end connected to the regulating member;

a knob connected to an opposite end of the shaft to be turned to rotate the regulating member;

a stop board located between the valve member of the regulating valve and the knob, wherein the stop has a curved slot, which has a first stop portion, a second stop portion, and a third stop portion; and a restricting device connected to the knob and engaged in the curved slot of the stop board, wherein the restricting device is movable in the curved slot either between the second stop portion and the third stop portion, or between the first stop portion and the third stop portion;

wherein the knob is turnable within a first internal if the restricting device is movable between the second stop portion and the third stop portion, and is turnable within a second internal if the restricting device is movable between the first stop portion and the third stop portion;

wherein when the knob is turnable within the second interval, a maximum gas flow which the regulating valve is able to supply is larger than that when the knob is turnable within the first interval.

2. The switching assembly of the gas stove of claim 1, wherein the first stop portion and the third stop portion are at opposite ends of the curved slot, and the second stop portion is between the first stop portion and the third stop portion.

3. The switching assembly of the gas stove of claim 2, wherein a protrusion is projected from a sidewall of the curved slot, and the second stop portion is formed on an end of the protrusion.

4. The switching assembly of the gas stove of claim 2, wherein a width of the curved slot between the third stop portion and the second stop portion is greater than that between the first stop portion and the second stop portion.

5. The switching assembly of the gas stove of claim 1, wherein the restricting device includes a first post and a second post; the first post is detachably connected to the knob, and the second post is fixedly connected to the knob; the second post is engaged in the curved slot of the stop board, and never touches the second stop portion when the knob is turned; when the first post is connected to the knob, the knob is turnable within the first interval, and the first post is movable between the third stop portion and the second stop portion along with the turned knob; when the first post is disconnected to the knob, the knob is turnable within the second interval, and the second post is movable between the third stop portion and the first stop portion along with the turned knob.

6. The switching assembly of the gas stove of claim 5, wherein the knob is provided with a tube, and the first post is inserted into or removed out of the tube.

7. The switching assembly of the gas stove of claim 6, wherein the first post is inherently formed on the knob when the knob is made, and is taken off from the knob to be inserted into the tube.

8. The switching assembly of the gas stove of claim 1, wherein the restricting device includes a post, a first tube, and a second tube on the knob; the post is alternatively inserted in the first tube or the second tube; when the post is inserted in the first tube, the knob is turnable within the first interval, and the post is movable between the third stop portion and the second stop portion along with the turned knob; when the first post is inserted in the second tube, the knob is turnable within the second interval, and the post is movable between the third stop portion and the first stop portion along with the turned knob.

9. The switching assembly of the gas stove of claim 8, wherein the post is inherently formed on the knob when the knob is made, and is taken off from the knob to be inserted into the first tube or the second tube.

* * * * *